(12) United States Patent
Gaudreau, Jr. et al.

(10) Patent No.: US 9,579,996 B2
(45) Date of Patent: Feb. 28, 2017

(54) INFANT HOLDER FOR VEHICLE SEAT

(75) Inventors: Paul D. Gaudreau, Jr., Indianapolis, IN (US); David Amirault, Indianapolis, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 831 days.

(21) Appl. No.: 13/427,684

(22) Filed: Mar. 22, 2012

(65) Prior Publication Data
US 2012/0242129 A1 Sep. 27, 2012

Related U.S. Application Data

(60) Provisional application No. 61/466,374, filed on Mar. 22, 2011.

(51) Int. Cl.
*B60N 2/42* (2006.01)
*B60N 2/28* (2006.01)

(52) U.S. Cl.
CPC ......... *B60N 2/2872* (2013.01); *B60N 2/2812* (2013.01); *B60N 2/2851* (2013.01); *B60N 2/2863* (2013.01); *B60N 2/2881* (2013.01)

(58) Field of Classification Search
CPC .. B60N 2/2884; B60N 2/2881; A47D 15/006; B60R 22/105
USPC .............. 297/216.11, 216.12, 464, 484, 130
See application file for complete search history.

(56) References Cited

U.S. PATENT DOCUMENTS

| | | | |
|---|---|---|---|
| 3,596,986 A * | 8/1971 | Ragsdale | 297/183.6 |
| 4,186,961 A | 2/1980 | Farrell | |
| 4,743,063 A * | 5/1988 | Foster, Jr. | 297/130 |
| 4,883,701 A * | 11/1989 | Rankin et al. | 428/136 |
| 4,885,200 A | 12/1989 | Perdelwitz | |
| 4,891,454 A * | 1/1990 | Perdelwitz et al. | 428/137 |
| 4,892,769 A | 1/1990 | Perdelwitz | |
| D312,549 S | 12/1990 | Perdelwitz | |
| D312,550 S | 12/1990 | Rankin | |
| D313,525 S | 1/1991 | Perdelwitz | |
| D313,526 S | 1/1991 | Rankin | |
| D313,527 S | 1/1991 | Perdelwitz | |
| D313,528 S | 1/1991 | Perdelwitz | |
| D313,723 S | 1/1991 | Rankin | |
| 5,127,120 A * | 7/1992 | Mason | 5/655 |
| 5,228,745 A | 7/1993 | Hazel | |
| 5,431,478 A * | 7/1995 | Noonan | 297/130 |
| 5,482,352 A | 1/1996 | Leal | |
| 5,735,576 A | 4/1998 | Pepys | |
| 5,833,309 A | 11/1998 | Schmitz | |
| 5,836,650 A | 11/1998 | Warner, Jr. et al. | |
| D402,152 S | 12/1998 | Seats | |
| 6,000,753 A * | 12/1999 | Cone, II | 297/256.16 |
| 6,341,818 B1 * | 1/2002 | Verbovszky et al. | 297/219.12 |
| 6,386,639 B1 | 5/2002 | McMichael | |
| 6,428,099 B1 * | 8/2002 | Kain | 297/256.1 |
| 6,467,840 B1 * | 10/2002 | Verbovszky et al. | 297/219.12 |
| 6,811,216 B2 | 11/2004 | Sedlack | |
| 6,926,359 B2 | 8/2005 | Runk | |
| 7,044,549 B2 * | 5/2006 | Maier et al. | 297/253 |
| 7,097,243 B2 | 8/2006 | Verbovszky | |

(Continued)

*Primary Examiner* — David R Dunn
*Assistant Examiner* — Alexander Harrison
(74) *Attorney, Agent, or Firm* — Barnes & Thornburg LLP

(57) ABSTRACT

A child restraint includes a juvenile seat and a child-restraint harness coupled to the juvenile seat. The child-restraint harness includes at least two shoulder belts.

22 Claims, 6 Drawing Sheets

(56) References Cited

U.S. PATENT DOCUMENTS

| | | | |
|---|---|---|---|
| 7,219,958 B2* | 5/2007 | Yamazaki et al. | 297/256.13 |
| 7,748,780 B2 | 7/2010 | Sizemore | |
| 7,841,657 B2* | 11/2010 | Nishimoto et al. | 297/219.12 |
| 2002/0014793 A1 | 2/2002 | Santha | |
| 2002/0089228 A1* | 7/2002 | Takayama | 297/484 |
| 2002/0195867 A1* | 12/2002 | Barger et al. | 297/484 |
| 2004/0124676 A1* | 7/2004 | Kain | 297/250.1 |
| 2006/0076812 A1* | 4/2006 | Ward | 297/250.1 |
| 2010/0026059 A1 | 2/2010 | Amirault et al. | |
| 2010/0148543 A1* | 6/2010 | Runk et al. | 297/216.12 |
| 2012/0098304 A1* | 4/2012 | Gaudreau, Jr. | 297/216.11 |
| 2012/0306243 A1* | 12/2012 | Oltman et al. | 297/216.11 |

* cited by examiner

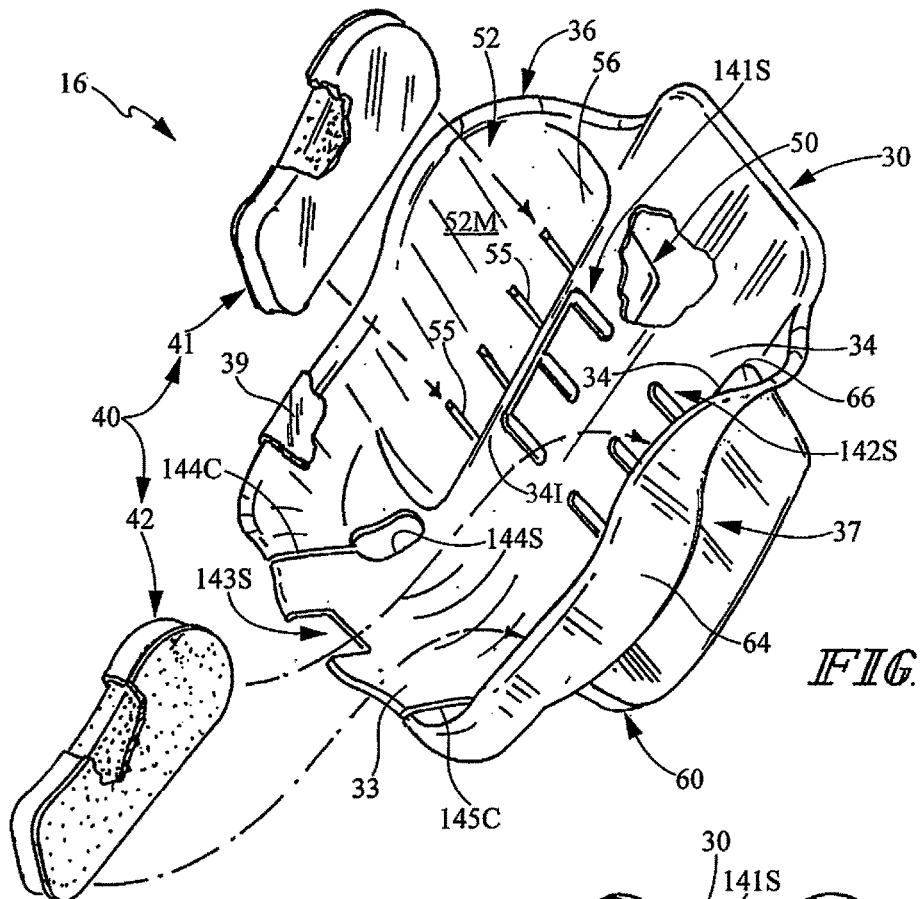
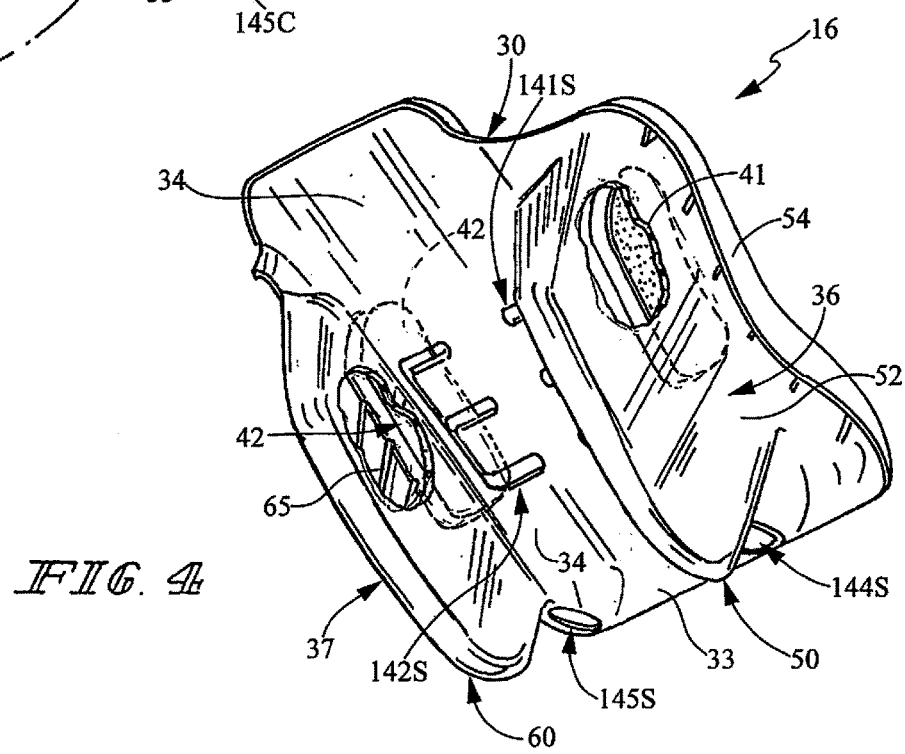

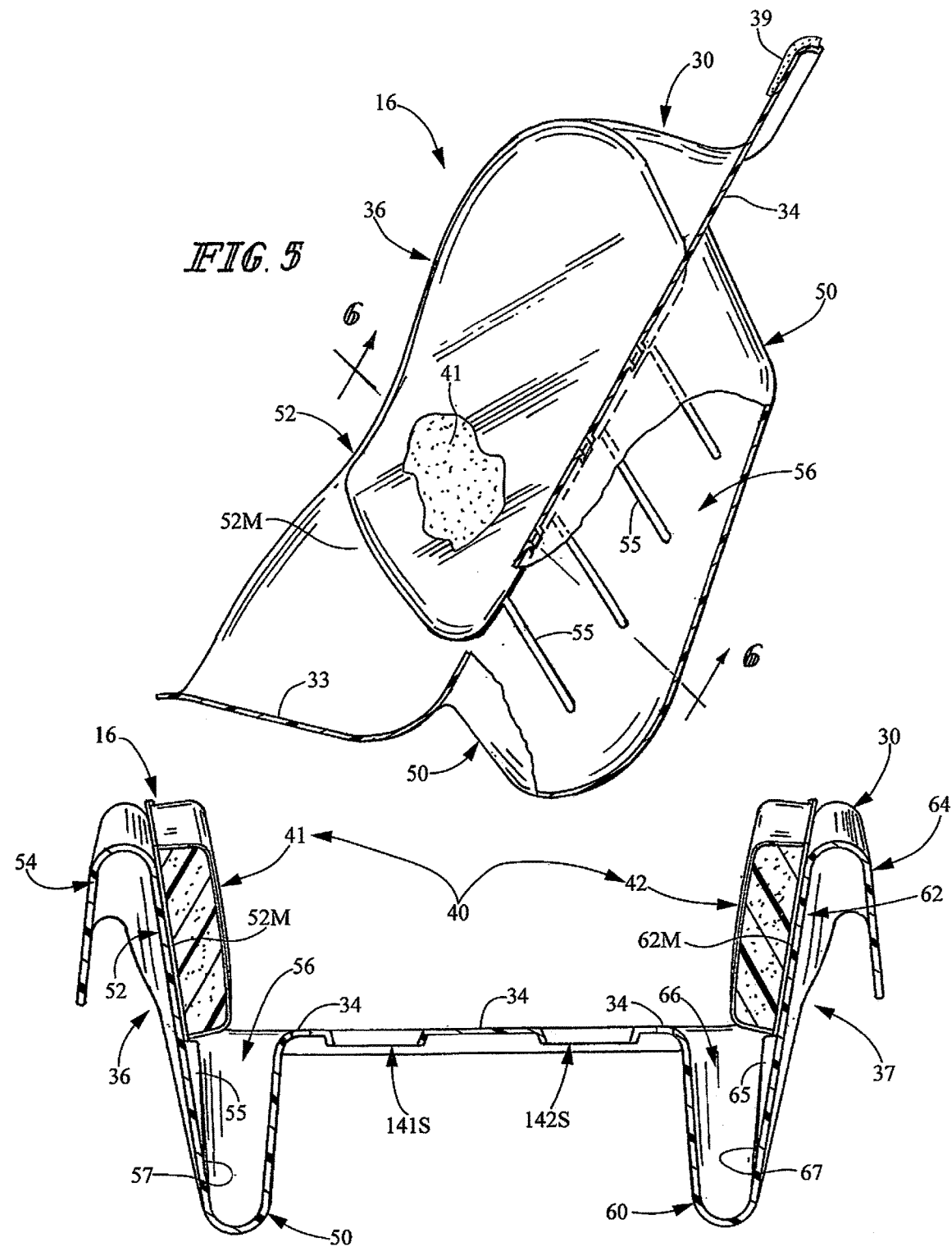

INFANT HOLDER FOR VEHICLE SEAT

PRIORITY CLAIM

This application claims priority under 35 U.S.C. §119(e) to U.S. Provisional Application Ser. No. 61/466,374, filed Mar. 22, 2011, which is expressly incorporated by reference herein.

BACKGROUND

The present disclosure relates to child restraints, and in particular to juvenile seats for use on passenger seats in vehicles. More particularly, the present disclosure relates to an infant-support insert adapted to be placed on a juvenile seat to support an infant in the juvenile seat.

SUMMARY

A child restraint includes a juvenile seat and a child-restraint harness coupled to the juvenile seat. The juvenile seat includes a seat bottom and a seat back extending upwardly from the seat bottom and cooperating with the seat bottom to define a juvenile seat shell.

In illustrative embodiments, the child restraint includes an infant holder in accordance with the present disclosure. The infant holder includes an infant-support shell configured to nest in a basin formed by the seat bottom and the seat back. The infant-support shell includes a seat pad adapted to lie on the seat bottom and a backrest arranged to extend upwardly from the seat pad and establish a desirable infant recline angle of an infant seated on the infant holder located in the basin formed in the juvenile seat.

In illustrative embodiments, the child restraint also includes a headrest mounted for up-and-down movement relative to the seat back. The headrest is also coupled to first and second shoulder belts included in the child-restraint harness so that those belts are raised and lowered relative to the seat bottom during up-and-down movement of the headrest on the seat back. Placement of the infant holder in the basin of the juvenile seat does not hinder movement of the headrest and shoulder belts relative to the juvenile seat shell and to the infant holder owing, in part, to the integration of the shoulder belts in belt-receiving slots formed in the infant holder.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is an exploded perspective assembly top view of the infant holder of FIGS. 1 and 2 showing that the infant holder comprises an infant-support shell formed to include several belt-receiving openings, a first ride-down pad configured to mate with a first side unit located on a far side of the infant-support shell, and a second ride-down pad configured to mate with a second side unit located on a near side of the infant-support shell and cooperate with the first ride-down pad to form an energy-dissipation system coupled to the infant-support shell;

FIG. 4 is a bottom perspective view of the infant holder of FIG. 3 after the components shown in FIG. 3 have been assembled and with portions broken away;

FIG. 5 is an enlarged sectional view of the infant holder taken along line 5-5 of FIG. 1;

FIG. 6 is a sectional view taken along line 6-6 of FIG. 5;

DETAILED DESCRIPTION

Figure 1:
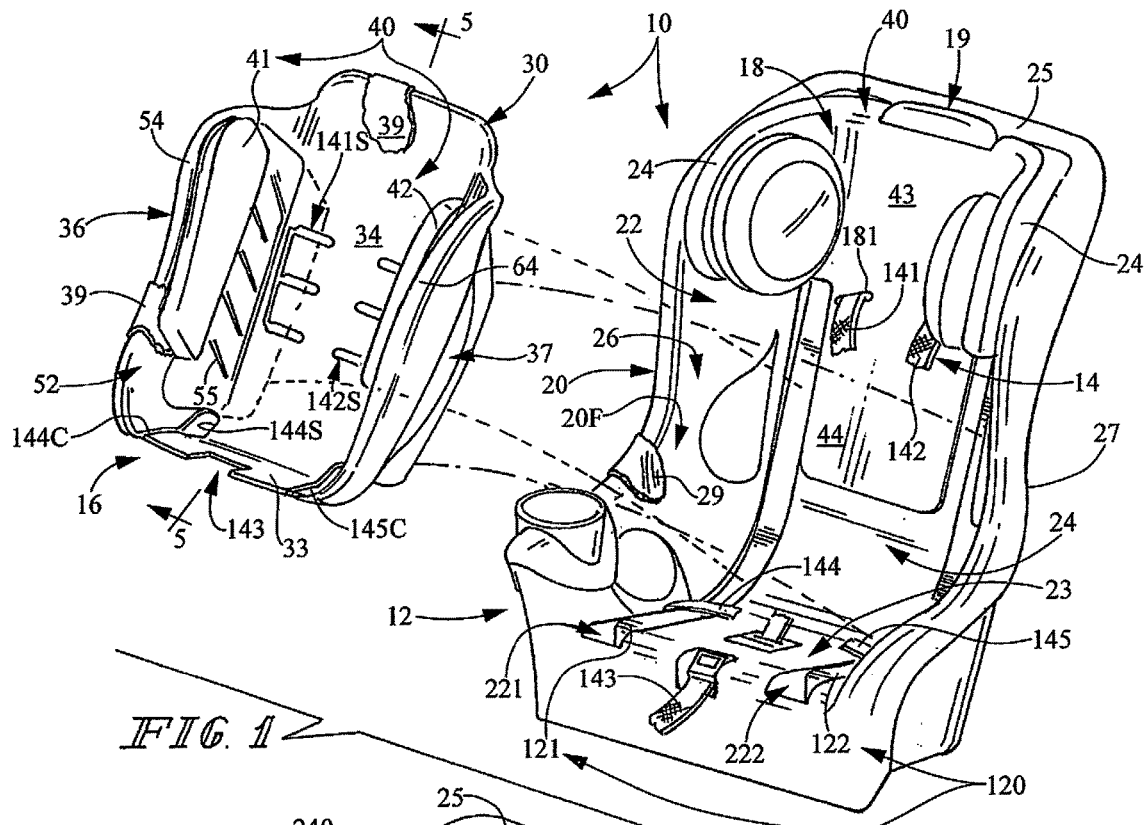
FIG. 1 is a perspective view of a juvenile seat configured to set on a passenger seat and carry a juvenile as shown, for example, in FIG. 7 and showing an infant holder in accordance with the present disclosure that is configured to mate with the juvenile seat.
Figure 2:
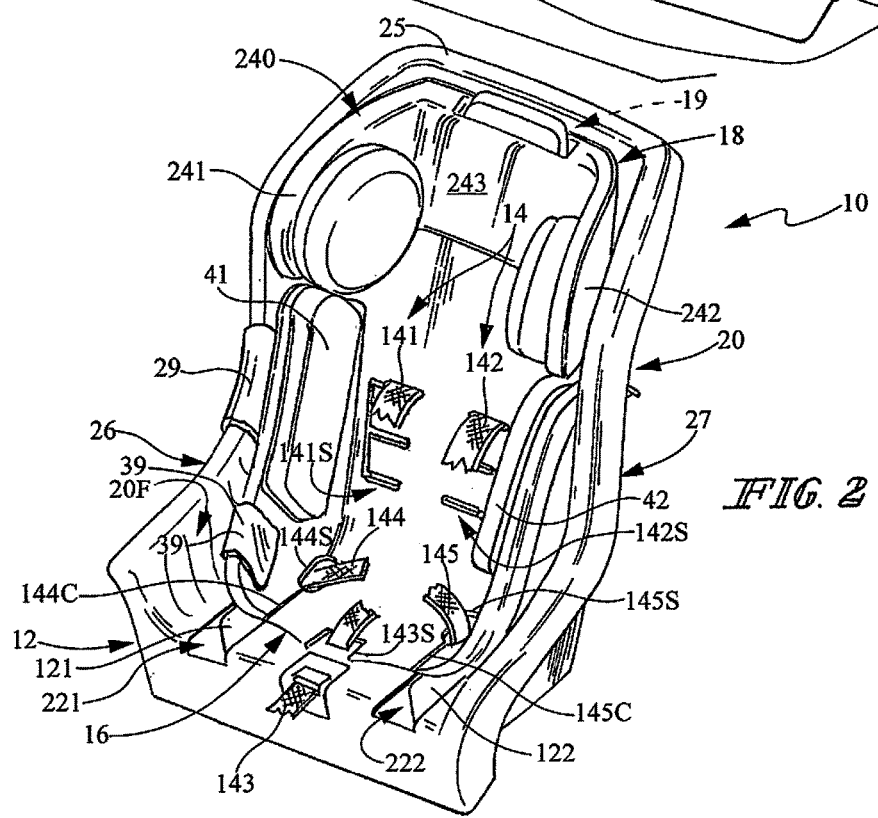
FIG. 2 is a perspective view of a child restraint in accordance with the present disclosure showing the infant holder of FIG. 1 placed on the seat bottom and seat back of the juvenile seat to adapt the juvenile seat to hold an infant in a reclined position characterized by an infant recline angle suited to the well being of the infant as shown, for example, in FIG. 8 and showing that the child restraint further includes a child-restraint harness coupled to the juvenile seat and arranged to extend through belt-receiving openings formed in the infant holder so as to be able to restrain an infant supported in a supine position in the infant holder.

An illustrative child restraint 10 comprises a juvenile seat 12, a child-restraint harness 14, and an infant holder 16 as suggested in FIGS. 1 and 2. Juvenile seat 12 includes a headrest 18 coupled to child-restraint harness 14 and mounted for up-and-down movement on a seat shell 20. Infant holder 16 is sized and shaped to rest on a front face 20F of juvenile seat shell 20 and hold an infant 17 in a predetermined reclined orientation relative to juvenile seat shell 20 as suggested in FIG. 8 without interfering with up-and-down movement of headrest 18 relative to juvenile seat shell 20. Child-restraint harness 14 is configured to restrain both an older child 21 seated on juvenile seat shell 20 as suggested in FIG. 7 as well as an infant 17 seated on an infant holder 16 at rest on juvenile seat shell 20 as suggested in FIG. 8.

Juvenile seat shell 20 includes a seat bottom 23 and a seat back 24 arranged to extend upwardly from seat bottom 23 and terminate at a top edge 25 as shown, for example, in FIG. 1. In illustrative embodiments, juvenile seat shell 20 also includes a first side-wing panel 26 coupled to one side of seat bottom 23 and seat back 24 and an opposing second side-wing panel 27 coupled to an opposite side of seat bottom 23 and seat back 24 as suggested in FIG. 1. Each of seat bottom 23 and seat back 24 is arranged to extend laterally between first and second side-wing panels 26, 27. In illustrative embodiments, an outer fabric covering 29 included in juvenile seat 12 is mounted on juvenile seat shell 20 to cover seat shell 20 and a seat shell-rigidifying system 120 including first and second stiffener beams 121, 122 as suggested in FIGS. 1 and 2.

Front face 20F of juvenile seat shell 20 is defined, for example, by seat bottom 23, seat back 24, and side-wing panels 26, 27 as suggested in FIG. 1. Front face 20F of juvenile seat shell 20 is configured to form a basin 22 sized to receive either an older child 21 as suggested in FIG. 7 or infant holder 16 and an infant 17 as suggested in FIG. 8. In one illustrative embodiment, basin 22 is bounded by seat bottom 23 and seat back 24. In another illustrative embodiment, basin 22 is bounded by seat bottom 23, seat back 24, and side-wing panels 26, 27.

Infant holder 16 includes an infant-support shell 30 and an energy-dissipation system 40 mating with infant-support shell 30 and comprising first and second ride-down pads 41, 42 as suggested in FIGS. 1-3. Infant-support shell 30 is configured to lie on front face 20F of juvenile seat shell 20 in basin 22 to provide means for supporting an infant 21 at a selected infant recline angle in a posture and recline orientation well suited for an infant so that the infant 21 can be held in a restrained supine position on infant-support shell 30 in basin 22 using child-restraint harness 14 as suggested, for example, in FIG. 8. Juvenile seat shell 20 is used for seating a juvenile (see, e.g., FIG. 7) and infant-support shell 30 is nested to juvenile seat shell 20 when it is desired to seat an infant (see, e.g., FIG. 8). Each time the infant-support shell nests on the seat bottom and the seat back of the juvenile seat the infant-support shell and juvenile seat are at the same angle with respect to each other. Stated differently, the infant-support shell and the juvenile seat nest repeatedly at the same angle with respect to each other. In an illustrative embodiment, a seated and reclined infant 21 is reclined in basin 22 by infant holder 16 at infant recline angle I45 of about 45° relative to a vertical reference line V as shown, for example, in FIG. 8. In illustrative embodiments, an outer fabric covering 39 included in infant holder 16 is mounted on infant-support shell 30 to cover infant-support shell 30 and first and second ride-down pads 41, 42 as suggested in FIGS. 1 and 3.

Infant-support shell 30 includes a seat pad 33, a backrest 34 extending upwardly from seat pad 33, a first side unit 36 coupled to one side of seat pad 33 and backrest 34, and an opposing second side unit 37 coupled to an opposite side of seat pad 33 and backrest 34 as shown, for example, in FIG. 3. First side unit 36 is configured to receive and retain first ride-down pad 41 in a position alongside one edge 341 of backrest 34 as suggested in FIGS. 1, 3, 4, and 9. Second side unit 37 is configured to receive and retain second ride-down pad 42 in a position alongside an opposite edge 342 of backrest 34 as also suggested in FIGS. 1, 3, 4, and 9.

Seat pad 33 of infant-support shell 30 is formed to include a centered crotch-belt slot 143S, a first thigh-belt channel 144 leading to a first thigh-belt slot 144S located on one side of seat pad 33 near first side unit 36, and a second thigh belt slot 145S located on an opposite side of seat pad 33 near second side unit 37 as suggested in FIGS. 3 and 4. As suggested in FIGS. 2 and 9, when infant-support shell 30 is placed in basin 22 on juvenile seat shell 20, crotch belt 143 passes through crotch-belt slot 143S, first thigh belt 144 passes through first thigh-belt slot 144S, and second thigh belt 145 passes through second thigh-belt slot 145S.

Backrest 34 of infant-support shell 30 is formed to include a first shoulder-belt slot 141S located on one side of backrest 34 near first side unit 36 and a second shoulder-belt slot 142S located on an opposite side of backrest 34 near second side unit 37 as suggested in FIGS. 1, 3, 4, and 9. In illustrative embodiments, first shoulder-belt slot 141S is E-shaped when viewed from the front as suggested in FIG. 3 and second shoulder-belt slot 142S is E-shaped when viewed from the rear as suggested in FIG. 4. As suggested in FIG. 9, each of slots 141S, 142S includes generally horizontal spaced-apart low, middle, and high channels L. M, and H and a generally vertical travel channel T interconnecting companion channels L, M, and H. Owing to such a channel configuration, a caregiver can adjust the height of child-restraint harness 14 relative to infant holder 16 while infant holder 16 remains substantially in place in basin 22 on juvenile seat shell 20 (without rethreading) by moving first shoulder belt 141 in slot 141S to a selected companion channel 141L, M, or H and by moving second shoulder belt 142 in slot 142S to a selected companion channel 142L, M, or H as suggested in FIG. 9.

First side unit 36 of infant holder 16 includes a downwardly extending first bolster 50 coupled to first edge 341 of backrest 34 as suggested in FIGS. 4 and 6. First side unit 36 also includes an upwardly extending first pad-support panel 52 coupled to an outer portion of first bolster 50 and an outer rim 54 coupled to an outer portion of first pad-support panel 52 as shown, for example, in FIG. 6. In illustrative embodiments, first ride-down pad 41 is coupled using any suitable means to an inwardly facing mount surface 52M of first pad-support panel 52. A series of spaced-apart ribs 55 are formed in (or coupled to) first bolster 50 and arranged to extend toward backrest 34 as suggested in FIGS. 6 and 9 to provide means for locating first ride-down pad 41 on mount surface 52M of first pad-support panel 52 in a selected position outside of a hollow chamber 56 formed in first bolster 50. In an illustrative embodiment, bolster 50 includes an inner surface 57 forming an outer boundary of hollow chamber 56 and lying below and merging with mount surface 52M as suggested in FIG. 6.

Second side unit 37 of infant holder 16 includes a downwardly outer extending second bolster 60 coupled to second edge 342 of backrest 34 as suggested in FIGS. 3, 4, and 6. Second side unit 37 also includes an upwardly extending second pad-support panel 62 coupled to an outer portion of second bolster 60 and an outer rim 64 coupled to an outer portion of second pad-support panel 62 as shown, for example, in FIG. 6. In illustrative embodiments, second ride-down pad 42 is coupled using any suitable means to an inwardly facing mount surface 62M of second pad-support panel 62. A series of spaced-apart ribs 65 are formed in (or coupled to) second bolster 60 and arranged to extend toward backrest 34 as suggested in FIGS. 6 and 9 to provide means for locating second ride-down pad 42 on mounting surface 62M of second pad-support panel 62 in a selected position outside of a hollow chamber 66 formed in second bolster 60. In an illustrative embodiment, bolster 60 includes an inner surface 67 forming an outer boundary of hollow chamber 66 and lying below and merging with mount surface 62M as suggested in FIG. 6.

Each ride-down pad 41, 42 is a force dissipater configured to dissipate energy and minimize g-loads experienced by an infant 17 restrained in infant holder 16 in basin 22 on juvenile seat shell 20 during exposure of a vehicle carrying child restraint 10 to an external impact. Reference is hereby made to U.S. application Ser. No. 12/512,798, filed Jul. 30, 2009, and published on Feb. 4, 2010 as Publication No. US 2010/0026059, which application is hereby incorporated by reference herein, for a disclosure of a ride-down pad suitable for use in child restraint 10.

Figure 7:
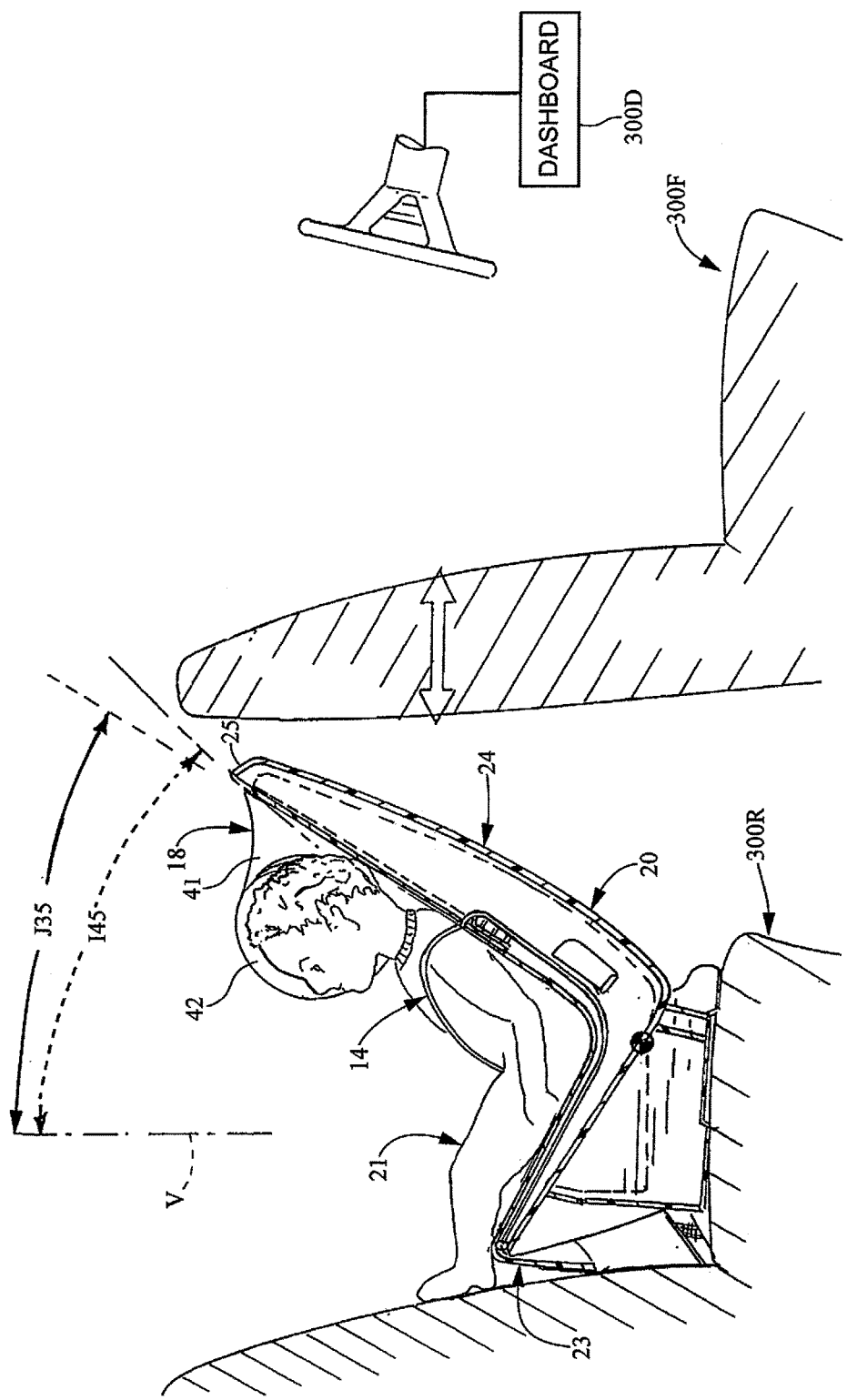
FIG. 7 is a sectional view showing the juvenile seat of FIG. 1 in a rearward-facing position on a rear passenger seat in a vehicle, suggesting that the seated and restrained juvenile is reclined by the juvenile seat at a juvenile recline angle of about 45°.
Figure 8:
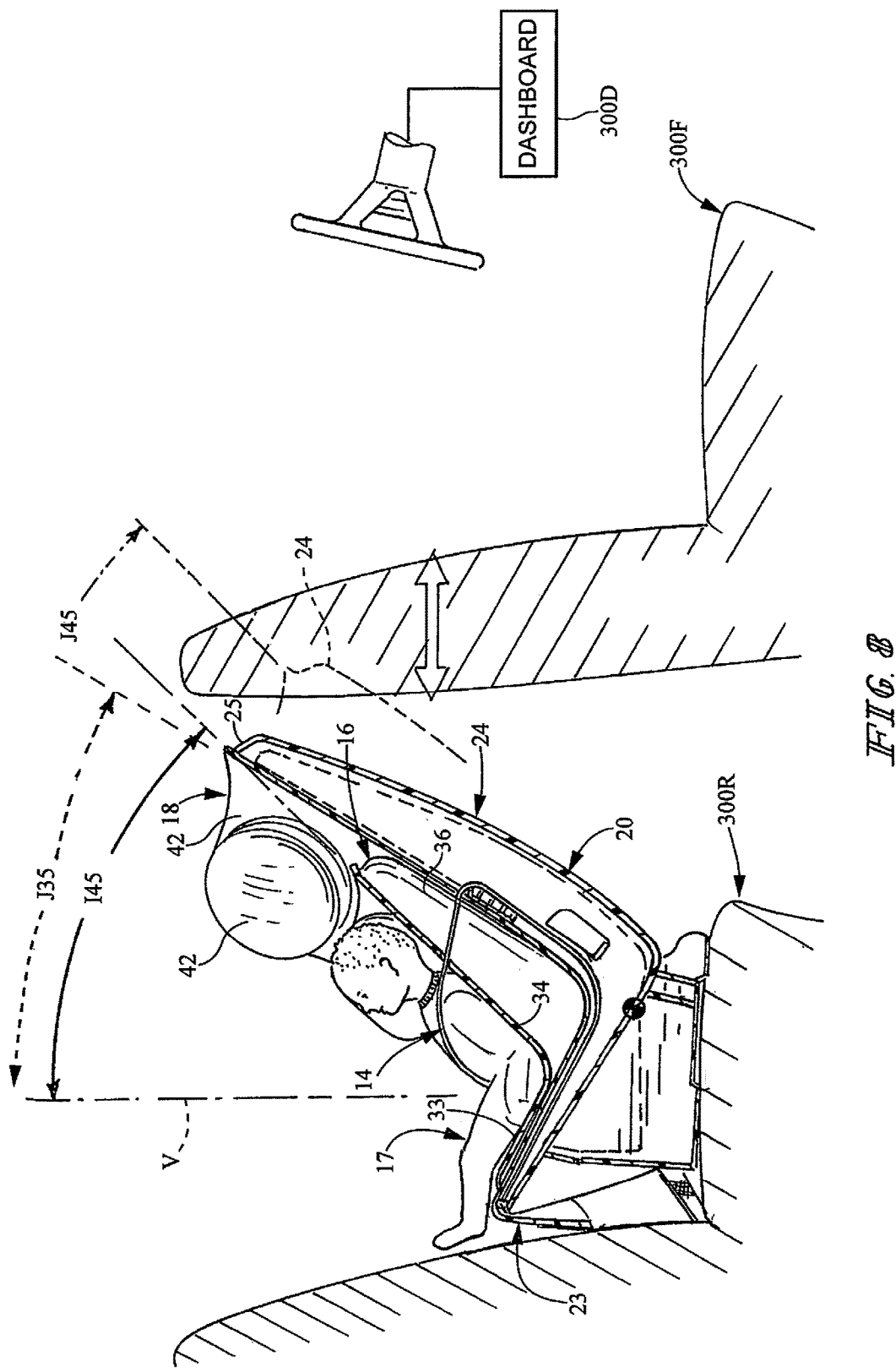
FIG. 8 is a sectional view similar to FIG. 7 of the child restraint of FIG. 2 in a rearward-facing position on the rear passenger seat in a vehicle suggesting that the much smaller supported and restrained infant is reclined by the infant holder that is mounted on the juvenile seat at an infant recline angle of about 45°.
Figure 9:
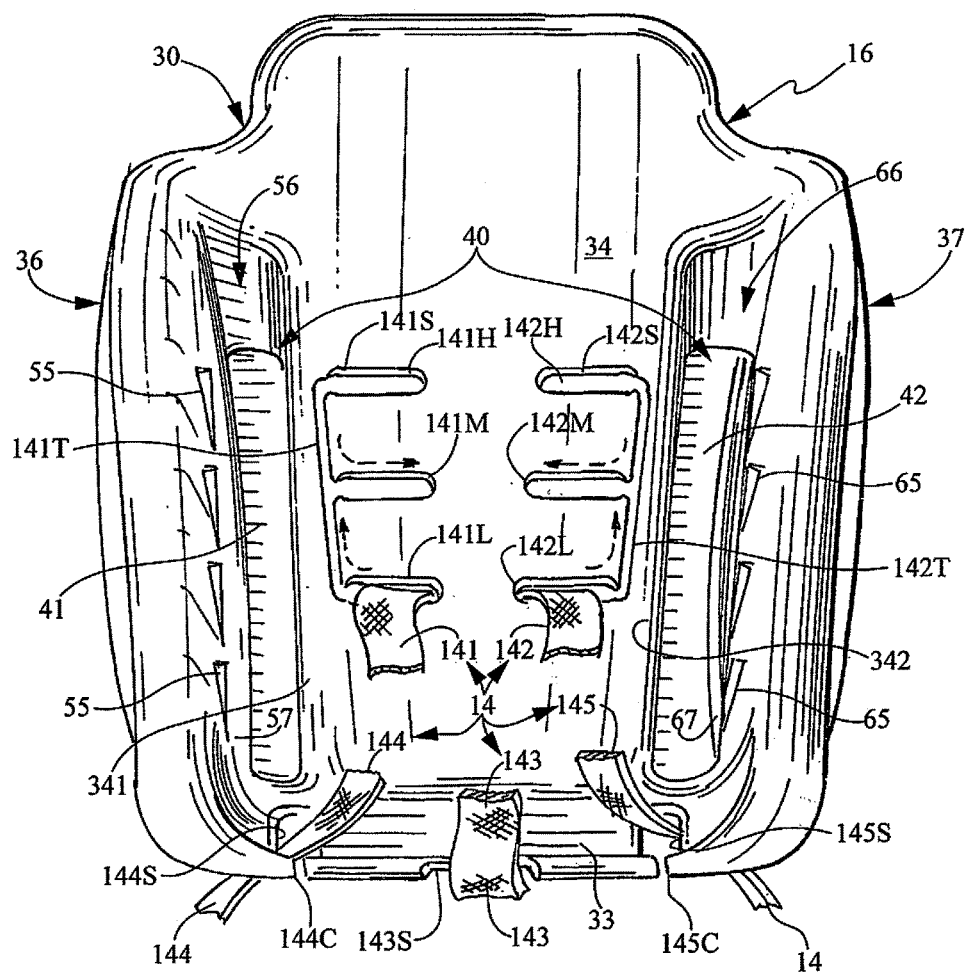
FIG. 9 is a front elevation view of the infant insert of FIGS. 1 and 3-6 in combination with the child-restraint harness suggesting how shoulder belts in the child-restraint harness can be moved among several belt-receiving slots formed in the infant-support shell without removal of the infant-support shell from the seat bottom and without rethreading to accommodate infants of various lengths in the infant holder.

Child-restraint harness 14 is used to restrain an older child 21 sitting on seat shell 20 as suggested in FIG. 7 and an infant 17 sitting on an infant holder 16 placed in basin 22 on juvenile seat shell 20 as suggested in FIG. 8. Child-restraint harness 14 in an illustrative embodiment is configured to include shoulder belts 141, 142, a crotch belt 143, and thigh belts 144, 145 as suggested in FIGS. 2 and 9. Belt-travel channels (not shown) formed in seat back 24 allow shoulder belts 141, 142 to move with headrest 18 along the length of seat back 24 and relative to seat bottom 23 between raised and lowered positions while infant holder 16 lies in a stationary position on juvenile seat shell 20.

Headrest 18 is coupled to first and second shoulder belts 141, 142 included in child-restraint harness 14 as suggested in FIG. 1. Headrest 18 is mounted for up-and-down movement on seat back 24 included in juvenile seat shell 20 so that the headrest 18 can be raised or lowered relative to seat bottom 23 to a selected height position that is adapted and suited to cradle the heads of both smaller and larger children 21 that are seated directly on juvenile seat shell 20 of juvenile seat 12. As headrest 18 is raised or lowered using a headrest-height controller 19 included in juvenile seat 12, the shoulder belts 141, 142 coupled to the headrest 18 move up and down therewith automatically relative to juvenile seat shell 20 (and, if present, infant holder 16) so that the shoulder belts 141, 142 properly engage and restrain both smaller and larger children 21 seated directly on juvenile seat shell 20 and an infant 17 seated on an infant holder 16 placed in basin 22 on juvenile seat shell 20.

In illustrative embodiments, juvenile seat 12 further includes a shell-rigidifying system 120 comprising first and second stiffener beams 121, 122 sized to be retained in first and second beam-receiver channels 221, 222 formed in juvenile seat shell 20 as suggested in FIGS. 1 and 2. Each of seat bottom 23 and seat back 24 is configured to carry first and second stiffener beams 121, 122 in an illustrative embodiment as suggested in FIG. 1. When placed in basin 22 on juvenile seat shell 20, infant holder 16 is arranged to overlie most of first and second stiffener beams 121, 122 in an illustrative embodiment as suggested in FIG. 2. Headrest 18 is configured and arranged to transfer any load applied to child-restraint harness 14 and to the first and second stiffener beams 121, 122 coupled to juvenile seat shell 20 as a result of movement of an older child 21 seated on seat bottom and back 23, 24 of juvenile seat shell 20 as shown in FIG. 7 or an infant 17 seated on infant holder 16 placed in basin 22 on juvenile seat shell 20 as shown in FIG. 8 relative to juvenile seat shell 20 during exposure of a vehicle carrying child restraint 10 to an external impact force.

Head cradle 240 of headrest 18 includes a harness-control panel 243 formed to include first and second belt-receiving slots 181, 182. A plate mount 244 is coupled to harness-control panel 243 and arranged to extend downwardly toward seat bottom 23. Head cradle 240 also includes a first side wing 241 coupled to one side of harness-control panel 243 and a second side wing 242 coupled to another side of harness-control panel 243 as suggested in FIG. 5. Illustratively, a head of an older child 21 seated on juvenile seat shell 20 of juvenile seat 12 is positioned to lie between first and second side wings 241, 242 on harness-control panel 243 as suggested in FIG. 7.

In an illustrative embodiment, infant holder 16 is adapted for use in a convertible car seat to enhance seating opportunities for infants in a convertible car seat. When juvenile seat 12 is installed in a rear-facing position on a rear passenger seat 300R in a vehicle, infant holder 16 functions to establish a desirable infant recline angle I45 for an infant 17 seated in infant holder 16 placed in basin 22 on juvenile seat shell 20 as suggested in FIG. 8. In this situation, backrest 34 of infant holder 16 is arranged to lie at an angle to seat back 24 of neighboring juvenile seat shell 20 as suggested in FIG. 8.

Rear bolsters 50, 60 are contoured to match the curve and contour of juvenile seat shell 20 of juvenile seat 12. Such contouring provides bolster means for automatically finding an optimal position of infant holder 16 on juvenile seat shell 20 when a caregiver mounts infant holder 16 in basin 22 on front face 20F of juvenile seat shell 20.

Infant holder 16 provides means for correcting an infant's back angle to a desirable 45° and lower shoulder belts 141, 142 to a size suited to an infant 21 restrained in infant holder 16. Infant holder 16 also has channels 141S, 142S formed so that once shoulder belts 141, 142 are threaded into infant holder 16, the belts 141, 42 will not have to be rethreaded when changing the height of shoulder belts 141, 142 relative to seat bottom 23. Infant holder 16 also has two ride-down pads 41, 42 and is wrapped completely in fabric in an illustrative embodiment.

Juvenile seat 12 is configured to establish a juvenile recline angle J35 of about 35° for a juvenile 17 seated on seat bottom 23 and leaning backward against seat back 24 as shown, for example, in FIG. 7. Such a juvenile recline angle J35 is desirable for juveniles. However, 45° is a more desirable recline angle for infants. To provide a 45° recline angle in juvenile seat 12, it would be necessary to pivot seat back 24 relative to seat bottom 23 in a counterclockwise direction to assume a position shown in phantom in FIG. 8 and characterized by a recline angle J45 of about 45°. Such pivoting movement of seat back 24 for a child restraint mounted on rear passenger seat 300R could interfere with the adjacent forward passenger seat 300F as suggested in phantom lines in FIG. 8. To avoid such interference, the vehicle operator would have to move front passenger seat 300F forward toward the vehicle dashboard 300D and this could discomfort the vehicle operator.

In contrast, infant holder 16, when placed in basin 22 of seat shell 20, is configured to provide an infant recline angle I45 of about 45° between backrest 34 of infant holder 16 and seat bottom 23 (seat pad 33) as suggested in FIG. 8. This provides more space in the vehicle cabin for the vehicle operator between front passenger seat 300F and dashboard 300D as it is unnecessary to move front passenger seat 300F away from rear passenger seat 300R and the recline seat back 24 of juvenile seat 12 to a larger juvenile recline angle J45.

The invention claimed is:

1. A child restraint comprising
   a juvenile seat adapted to be installed facing rearwardly on a passenger seat of a vehicle, the juvenile seat including a seat bottom and a seat back arranged to extend upwardly from the seat bottom, wherein a forwardly facing surface of the seat back and an upwardly facing surface of the seat bottom cooperate to define therebetween an included juvenile recline angle having a first angular measure to support a juvenile seated on the upwardly facing surface and leaning backward against the forwardly facing surface,
   an infant holder including an infant-support shell configured to removably nest on the upwardly facing surface of the seat bottom and the forwardly facing surface of the seat back in a basin formed by the seat bottom and seat back, wherein the infant-support shell includes a seat pad at rest on the upwardly facing surface of the seat bottom and a backrest arranged to extend upwardly from the seat pad and along the forwardly facing surface of the seat back and wherein a forwardly facing surface of the backrest and an upwardly facing surface of the seat pad cooperate to define therebetween an included infant recline angle having a second angular measure that is greater than the first angular measure of the included juvenile recline angle between the forwardly facing surface of the seat back and the upwardly facing surface of the seat bottom to provide means for supporting an infant in a reclined supine position in the infant-support shell while the infant-support shell is at rest on the seat bottom and the seat back to establish a recline orientation selected for an infant that is different than a more upright orientation associated with a juvenile seated on the seat bottom of the juvenile seat after removal of the infant-support shell from a nested position in the basin, a child-restraint harness comprising first and second shoulder belts, the backrest of the infant-support shell includes a first E-shaped shoulder-belt slot for receiving the first shoulder belt through the backrest and a second E-shaped shoulder-belt slot for receiving the second shoulder belt through the backrest and means coupled to the juvenile seat for raising and lowering the first and second shoulder belts relative to the seat bottom without hindrance when the infant-support shell is nested in the basin formed by the seat bottom and the seat back, and wherein each time the infant-support shell nests on the seat bottom and the seat back of the juvenile seat the infant-support shell and juvenile seat are at the same angle with respect to each other.

2. The child restraint of claim 1, wherein the child-restraint harness is coupled to the juvenile seat and configured to provide means for restraining a child seated on the seat bottom and for restraining a child seated on the seat pad when the infant-support shell is at rest on the seat bottom in the nested position in the basin.

3. The child restraint of claim 2, further comprising a headrest mounted for up-and-down movement relative to the seat back and wherein the child-restraint harness includes the first and second shoulder belts coupled to the headrest to move therewith relative to a juvenile seated on the seat bottom and to an infant reclined in a supine position on the seat pad and the backrest of the infant-support shell to provide means for raising and lowering the first and second shoulder belts relative to the seat bottom during up-and-down movement of the headrest on the seat back without hindrance when the infant-support shell is nested in the basin formed by the seat bottom and the seat back, and wherein the vertical portions of the first and second E-shaped shoulder-belt slots being located so that the horizontal portions of the first and second E-shaped shoulder-belt slots extend inwardly toward the center of backrest.

4. The child restraint of claim 1, wherein the first shoulder-belt E-shaped slot includes generally horizontal spaced-apart low, middle, and high channels and a generally vertical travel channel interconnecting the low, middle, and high channels of the first shoulder-belt slot to provide means for allowing the first shoulder belt to be moved between the low, middle, and high channels of the first shoulder-belt slot while the infant-support shell remains in the nested position in the seat basin without removal of the first shoulder belt from the first shoulder-belt slot and the second shoulder-belt E-shaped slot includes generally horizontal spaced-apart low, middle, and high channels and a generally vertical travel channel interconnecting the low, middle, and high channels of the second shoulder-belt slot to provide means for allowing the second shoulder belt to be moved between the low, middle, and high channels of the second shoulder-belt slot while the infant-support shell remains in the nested position in the seat basin without removal of the second shoulder belt from the second shoulder-belt slot.

5. The child restraint of claim 1, wherein the child-restraint harness further includes a crotch belt, a first thigh belt, and a second thigh belt and the seat pad of the infant-support shell is formed to include a centered crotch-belt slot receiving the crotch belt therein, a first thigh-belt channel leading to a first thigh-belt slot receiving the first thigh belt therein, and a second thigh-belt channel leading to a first thigh-belt slot receiving the second thigh-belt therein.

6. The child restraint of claim 3, wherein the headrest includes a harness-control panel formed to include a first belt-receiving slot receiving the first shoulder belt therein and a second belt-receiving slot receiving the second shoulder belt therein and the headrest further includes a plate mount coupled to the harness-control panel and arranged to extend downwardly toward the upwardly facing surface of the seat bottom and to lie between the forwardly facing surface of the seat back and the backrest of the infant-support shell and to move therebetween during up-and-down movement of the headrest relative to the seat bottom.

7. The child restraint of claim 6, wherein the first shoulder-belt E-shaped slot includes generally horizontal spaced-apart low, middle, and high channels and a generally vertical travel channel interconnecting the low, middle, and high channels of the first shoulder-belt slot to provide means for allowing the first shoulder belt to be moved between the low, middle, and high channels of the first shoulder-belt slot while the infant-support shell remains in the nested position in the seat basin without removal of the first shoulder belt from the first shoulder-belt slot and the second shoulder-belt E-shaped slot includes generally horizontal spaced-apart low, middle, and high channels and a generally vertical travel channel interconnecting the low, middle, and high channels of the second shoulder-belt slot to provide means for allowing the second shoulder belt to be moved between the low, middle, and high channels of the second shoulder-belt slot while the infant-support shell remains in the nested position in the seat basin without removal of the second shoulder belt from the second shoulder-belt slot.

8. The child restraint of claim 1, wherein the second angular measure of the included infant recline angle is more than 5° greater than the first angular measure of the included juvenile recline angle.

9. The child restraint of claim 8, wherein the second angular measure of the included infant recline angle is about 10° greater than the first angular measure of the included juvenile recline angle.

10. The child restraint of claim 8, wherein the first angular measure of the included juvenile recline angle is about 35° and the second angular measure of the included infant recline angle is about 45°.

11. The child restraint of claim 1, wherein the infant holder further includes an energy-dissipation system mating with the infant-support shell and including a first ride-down pad arranged to lie along a first side of the backrest and a second ride-down pad arranged to lie along a second side of the backrest and in spaced-apart relation to the first ride-down pad to define therebetween means for receiving an infant reclined in a supine position on the backrest of the infant-support shell.

12. The child restraint of claim 11, wherein the infant holder further includes an outer fabric covering mounted on the infant-support shell to cover the infant-support shell and the first and second ride-down pads.

13. The child restraint of claim 11, wherein the infant-support shell further includes a first side unit coupled to the first side of the backrest and to the first ride-down pad and an opposing second side unit coupled to the second side of the backrest and to the second ride-down pad.

14. The child restraint of claim 13, wherein the first side unit includes a downwardly extending first bolster coupled to the first side of the backrest and arranged to extend into a first bolster-receiving channel formed in a juvenile seat shell defined by the seat bottom and the seat back to open toward the infant-support shell and the second side unit includes a downwardly extending second bolster coupled to the second side of the backrest and arranged to extend into a second bolster-receiving channel formed in the juvenile seat shell to open toward the infant-support shell.

15. The child-restraint of claim 14, wherein the first and second bolsters are contoured to match curve and contour of the underlying juvenile seat shell to provide means for automatically finding an optimal position of the infant holder on the seat shell when a caregiver mounts the infant-support shell in the basin.

16. The child restraint of claim 14, wherein each of the first and second bolsters includes an inner surface forming an outer boundary of a hollow chamber, the first ride-down pad is arranged to lie above the hollow chamber of the first bolster, and the second ride-down pad is arranged to lie above the hollow chamber of the second bolster.

17. The child restraint of claim 14, wherein the first side unit including an upwardly extending first pad-support panel coupled to an outer portion of the first bolster and an outer rim coupled to an outer portion of the first pad-support panel, and the first ride-down pad is coupled to an inwardly facing mount surface of the first pad-support panel.

18. A child restraint comprising
a juvenile seat adapted to be installed facing rearwardly on a passenger seat of a vehicle, the juvenile seat including a seat bottom and a seat back arranged to extend upwardly from the seat bottom, wherein a forwardly facing surface of the seat back and an upwardly facing surface of the seat bottom cooperate to define therebetween an included juvenile recline angle having a first angular measure to support a juvenile seated on the upwardly facing surface and leaning backward against the forwardly facing surface,
an infant holder including an infant-support shell configured to nest on the upwardly facing surface of the seat bottom and the forwardly facing surface of the seat back in a basin formed by the seat bottom and seat back, wherein the infant-support shell includes a seat pad at rest on the upwardly facing surface of the seat bottom and a backrest arranged to extend upwardly from the seat pad and along the forwardly facing surface of the seat back and wherein a forwardly facing surface of the backrest and an upwardly facing surface of the seat pad cooperate to define therebetween an included infant recline angle having a second angular measure that is greater than the first angular measure of the included juvenile recline angle between the forwardly facing surface of the seat back and the upwardly facing surface of the seat bottom to provide means for supporting an infant in a reclined supine position in the infant-support shell while the infant-support shell is at rest on the seat bottom and the seat back to establish a recline orientation selected for an infant that is different than a more upright orientation associated with a juvenile seated on the seat bottom of the juvenile seat after removal of the infant-support shell from a nested position in the basin,
a child-restraint harness comprising first and second shoulder belts, the backrest of the infant-support shell includes a first E-shaped shoulder-belt slot for receiving the first shoulder belt through the backrest and a second E-shaped shoulder-belt slot for receiving the second shoulder belt through the backrest and means coupled to the juvenile seat for raising and lowering the first and second shoulder belts relative to the seat bottom without hindrance when the infant-support shell is nested in the basin formed by the seat bottom and the seat back,
wherein the infant holder further includes an energy-dissipation system mating with the infant-support shell and including a first ride-down pad arranged to lie along a first side of the backrest and a second ride-down pad arranged to lie along a second side of the backrest and in spaced-apart relation to the first ride-down pad to define therebetween means for receiving an infant reclined in a supine position on the backrest of the infant-support shell,
wherein the infant-support shell further includes a first side unit coupled to the first side of the backrest and to the first ride-down pad and an opposing second side unit coupled to the second side of the backrest and to the second ride-down pad,
wherein the first side unit includes a downwardly extending first bolster coupled to the first side of the backrest and arranged to extend into a first bolster-receiving channel formed in a juvenile seat shell defined by the seat bottom and the seat back to open toward the infant-support shell and the second side unit includes a downwardly extending second bolster coupled to the second side of the backrest and arranged to extend into a second bolster-receiving channel formed in the juvenile seat shell to open toward the infant-support shell,
wherein the first side unit including an upwardly extending first pad-support panel coupled to an outer portion of the first bolster and an outer rim coupled to an outer portion of the first pad-support panel, and the first ride-down pad is coupled to an inwardly facing mount surface of the first pad-support panel, and
wherein the first side unit further includes a series of spaced-apart ribs associated with the first bolster and arranged to extend toward the backrest to provide means for locating the first ride-down pad on the inwardly facing mount surface in a selected position.

19. A child restraint comprises
a juvenile seat adapted to be installed facing rearwardly on a passenger seat of a vehicle, the juvenile seat including a seat bottom, a seat back extending upwardly from the seat back and cooperating with the seat bottom to form a juvenile seat shell, and a headrest mounted for up-and-down movement on the seat back,
a child-restraint harness coupled to the seat bottom and the seat back and configured to include first and second shoulder belts coupled to the headrest to be raised and lowered relative to the seat bottom during up-and-down movement of the headrest on the seat back, and an infant holder including an infant-support shell formed to include an E-shaped first belt-receiving slot receiving the first shoulder belt therein and an E-shaped second belt-receiving slot receiving the second shoulder belt therein and configured to nest in a basin defined by the seat bottom and the seat back of the juvenile seat shell without hindering movement of the headrest and the first and second shoulder belts relative to the juvenile seat shell, wherein the infant seat shell includes a seat pad and a backrest extending upwardly from the seat pad, the seat back of the juvenile seat shell includes a forwardly facing surface adapted to engage the back of a juvenile seated on the seat bottom and arranged to lie along a slope with respect to a vertical reference line at a fixed juvenile recline angle of about 35°, and the seat pad of the infant-support shell is adapted to engage the back of an infant supported in a supine position on the infant-support shell and arranged to lie along a slope with respect to the vertical reference line at a fixed infant recline angle of about 45°, and means coupled to the juvenile seat for raising and lowering the first and second shoulder belts relative to the seat bottom without hindrance when the infant-support shell is nested in the basin formed by the seat bottom and the seat back, wherein the infant-support shell and the juvenile seat nest repeatedly at the same angle with respect to each other.

20. The child restraint of claim 1 wherein the infant-support shell seat pad is in contact with the upwardly facing surface of the seat bottom and is in contact with the forwardly facing surface of the seat back.

21. The child restraint of claim 19 wherein the seat pad of the infant-support shell is adapted to be in contact with the seat back and the seat bottom.

22. A child restraint comprising a juvenile seat adapted to be installed facing rearwardly on a passenger seat of a vehicle, the juvenile seat including a seat bottom and a seat back arranged to extend upwardly from the seat bottom, wherein a forwardly facing surface of the seat back and an upwardly facing surface of the seat bottom cooperate to define therebetween an included juvenile recline angle having a first angular measure to support a juvenile seated on the upwardly facing surface and leaning backward against the forwardly facing surface, an infant holder including an infant-support shell configured to removably nest on the upwardly facing surface of the seat bottom and the forwardly facing surface of the seat back in a basin formed by the seat bottom and seat back, wherein the infant-support shell includes a seat pad at rest on the upwardly facing surface of the seat bottom and a backrest arranged to extend upwardly from the seat pad and along the forwardly facing surface of the seat back and wherein a forwardly facing surface of the backrest and an upwardly facing surface of the seat pad cooperate to define therebetween an included infant recline angle having a second angular measure that is greater than the first angular measure of the included juvenile recline angle between the forwardly facing surface of the seat back and the upwardly facing surface of the seat bottom to provide means for supporting an infant in a reclined supine position in the infant-support shell while the infant-support shell is at rest on the seat bottom and the seat back to establish a recline orientation selected for an infant that is different than a more upright orientation associated with a juvenile seated on the seat bottom of the juvenile seat after removal of the infant-support shell from a nested position in the basin, and a child-restraint harness comprising first and second shoulder belts, the backrest of the infant-support shell includes a first E-shaped shoulder-belt slot for receiving the first shoulder belt through the backrest and a second E-shaped shoulder-belt slot for receiving the second shoulder belt through the backrest and means coupled to the juvenile seat for raising and lowering the first and second shoulder belts relative to the seat bottom without hindrance when the infant-support shell is nested in the basin formed by the seat bottom and the seat back, wherein the child-restraint harness is coupled to the juvenile seat and configured to provide means for restraining a child seated on the seat bottom and for restraining a child seated on the seat pad when the infant-support shell is at rest on the seat bottom in the nested position in the basin, and further comprising a headrest mounted for up-and-down movement relative to the seat back and wherein the child-restraint harness includes the first and second shoulder belts coupled to the headrest to move therewith relative to a juvenile seated on the seat bottom and to an infant reclined in a supine position on the seat pad and the backrest of the infant-support shell to provide means for raising and lowering the first and second shoulder belts relative to the seat bottom during up-and-down movement of the headrest on the seat back without hindrance when the infant-support shell is nested in the basin formed by the seat bottom and the seat back.

* * * * *